No. 788,451.

Patented April 25, 1905.

UNITED STATES PATENT OFFICE.

UMBERTO CIANTAR AND FREDERICK WILLIAM FORBES ROSS, OF LONDON, ENGLAND.

PROCESS OF MAKING MEAT EXTRACTS.

SPECIFICATION forming part of Letters Patent No. 788,451, dated April 25, 1905.

Application filed July 8, 1901. Serial No. 67,567.

*To all whom it may concern:*

Be it known that we, UMBERTO CIANTAR, merchant, and FREDERICK WILLIAM FORBES ROSS, M. D., subjects of the King of Great Britain, residing at London, England, have invented a Process of Making Meat Extracts, of which the following is a specification.

This invention relates to improvements in the art of recovering the coagulable muscle proteids from raw meat; and the objects of said invention are to materially increase the muscle proteids derived from a given amount of meat and to secure a product substantially free and pure from the waste-product compounds, excessive losses, and inferior products, or results common to the well-known meat-extract processes now in use.

Hitherto the processes used for the manufacture of extracts, essences, teas, &c., from raw meat have been accompanied by an excessive loss of the highly-nutritive substances of the meat under treatment, such substances as a rule being entirely absent. Such extracts upon analysis have been found to contain waste products almost wholly, if not entirely, in combination with various gelatins or other substances. These results found in the existing processes as employed are primarily due to the insolubility of coagulable muscle proteids under certain conditions. In accordance with the present invention these coagulable muscle proteids are rendered soluble, whereby they may be recovered in large quantities in a commercially-practicable way. At the same time all waste-product compounds and gelatins are eliminated from the extract, the result being a commercial product in such quantity as to enable its use alone or in combination with other food substances.

The method of extracting the coagulable muscle proteids will first be described.

In carrying out this process first the meat is reduced to a pulp of very fine consistency through any suitable mechanical means, such as by crushing and mincing. This treatment ruptures the tubes or cells containing the coagulable proteids, reducing the same to its ultimate cellular elements. Second, this integrated or pulverized mass of meat is now subjected to the action of a cold saline solution, (such as derived from potassium sodium and magnesium chlorids, nitrates, carbonates, or lactates or any other suitable salt,) such salt solution being advantageously at a temperature ranging between 60° and 100° Fahrenheit, such saline solution being of such strength and so applied as to free and wash the coagulable proteids from their cells. During this treatment it may be found advantageous to agitate the solution to facilitate the washing action. This saline solution must be of such strength that no appreciable amount of matter will be rendered soluble at this stage of the treatment. In practice a solution of ten-per-cent. saline solution or an approximation thereto is applied in the proportion of, say, half an ounce of such saline solution to each pound of meat under treatment. Third, this mixture is now neutralized by the addition of an alkali, such as a hydrate or carbonate of alkali or ammonia or any other suitable alkaline salt—for instance, carbonate of soda. The purpose of this alkalization is to render the coagulable muscle proteids non-acid should any trace of acid be present. Fourth, water is now added to the solution (for about five minutes) until the solution has been reduced to one-per-cent. or .5-per-cent. solution. This will make a proportion of about two quarts of solution to each pound of meat. This solution is now agitated for about ten minutes. Fifth, the strength of the one-per-cent. or .5-per-cent. solution is now reduced to a saline solution of, say, .005 per cent. This solution will now contain—first, flocculated coagulable proteids in suspension in the saline solution; second, natural amido extractives, and, third, meat residue. Up to this time the coagulable proteids have been withdrawn from their tubes or cells in the meat fiber by means of the action of such cold solution, which cold solution, if desired, may be a saline solution—such as sodium, potassium, magnesium, &c.—in which the basic and acid radicals are actually combined in the presence of the meat to be treated. Sixth, the solution containing the coagulable proteids and other constituents is now filtered, which may be accomplished by passing the solution through some suitable woven material, such as woven muslin or lawn. This filtering action will allow the coagulable proteids held in suspension, (even though in floccules,) also the natural amido extractives in solution, to pass through the filter, the meat fiber being separated and prevented from passing through the filter. Seventh, the solution may now be heated or otherwise chemically treated to produce coagulation, the liquid being kept as still as possible to prevent disintegration during this treatment. The coagulable proteids will be found to adhere to the walls of the vessel containing the solution, others collecting in a thick layer floating upon the surface of the liquid. Eighth, the intervening clear liquid free from coagulable proteids may now be withdrawn from the vessel, as by means of a siphon or other convenient means, leaving the coagulated proteids to be collected, the remaining fluid being expelled therefrom in any suitable manner, such as by squeezing in a cloth. The recovered coagulated muscle proteids may now be treated in any desired way.

Should it be desired to utilize the waste-product compounds, as in Liebig's or any other well-known meat-extract process, the solid meat previously separated from the saline solution through filtration and the final solution from which the coagulated muscle proteids were separated may be mixed together and subjected to prolonged heating, such extracts consisting, mainly, of natural amido extractives and derived amido extractives as the result of prolonged heating. This solid meat above referred to may be also utilized, if desired, in preparing peptone, which may be accomplished either before or after heating.

Thus, briefly summed up, the process consists in reducing the raw meat to a very fine pulp, rendering the coagulable muscle proteids soluble, extracting them from the pulp by large quantities of a cold solution, and finally recovering the said proteids alone from such solution through precipitation.

The treatment for waste-product compounds consists in following the above process, and as a final step to add the solid meat pulp to the solution from which the coagulable muscle proteids have been recovered by precipitation and subjecting this mixture to prolonged heating.

If desired, the raw meat may be subjected to freezing action either before or after pulverization or both before and after, if desired. This freezing action acts as follows: First, it renders the meat more capable of fine pulverization, the particles of ice present acting as knife-edges or like powdered glass would act, thereby assisting or facilitating the complete reduction of the meat; second, the walls of the muscle-cells are rendered brittle, and the expansion of the cell contents caused by freezing ruptures these brittle walls, the coefficient of expansion of the cell contents and the cell-walls being different. Thus the cell contents containing the coagulable muscle proteids are disintegrated, thereby loosening and rendering the same more fluid on thawing, allowing the coagulable proteids to be afterward easily floated out of their cells irrespective of their solubility or insolubility.

By the process and treatment it will be seen that the coagulable muscle proteids are recovered before they are rendered insoluble within the meat and irrecoverably lost by the subsequent treatment of the extraction of the waste-product compounds.

By a modification of the foregoing process raw albuminous meat substances may be produced as follows: The pulverized mass of meat is subjected in bulk to the action of the hereinbefore-described specially-proportioned saline solution, which mass of meat and solution are mixed together in the following proportions, namely: The meat mass is first subjected to the action of a ten-per-cent. saline solution or thereabout in the proportion of, say, one-half ounce of such saline solution to each pound of meat, and the resulting mixture sieved or otherwise suitably treated to separate and remove the coarser fibrous material from said mixture, and the remaining finer matter with albumens is then dried at a temperature below the coagulating-point of albumen—say 100° Fahrenheit or thereabout—for instance, by centrifugal action or by pressure, or by the action of a mechanical or chemical absorbent of moisture, or by a current of dry air. This treatment furnishes a raw albuminous meat substance, which can then be used either with or without pulverization as a means for preparing raw albumens—namely, either by cold infusion and straining or as desired. The moisture thus extracted or separated and recovered can be treated to recover the contained albumens, as in the process first hereinbefore described.

Having thus described our said invention, what we claim, and desire to secure by Letters Patent of the United States, is—

1. The herein-described process for the recovery of coagulable muscle proteids from meat, consisting in reducing raw meat to a microscopic pulp, subjecting said pulp to the action of a saline solution, reducing said saline solution containing said pulp to a cold weak saline solution, filtering the solution thus produced to separate therefrom the meat fiber, subjecting the solution thus filtered to heat, and finally withdrawing the liquid from the coagulated proteids.

2. The herein-described process for the recovery of coagulable muscle proteids from meat, consisting in subjecting raw meat to freezing action, subjecting said pulp to the action of a saline solution, reducing said saline solution containing said pulp to a cold weak saline solution, filtering the solution thus produced to separate therefrom the meat fiber, subjecting the solution thus filtered to heat, and finally withdrawing the liquid from the coagulated proteids.

3. The herein-described process for the recovery of coagulable muscle proteids from meat, consisting in subjecting raw meat to the action of a saline solution, reducing said saline solution containing said pulp to a cold weak saline solution, separating the fibrous meat from said solution by filtration, coagulating the proteids in the solution thus filtered, and in finally withdrawing the liquid from said coagulated proteids.

4. The process for the recovery of the muscle proteids contained in meat, which consists in freezing the meat to break up the inner cellular structure, moistening the same with a saline solution which enters into the interior of the walls of the cells, washing out the muscle proteids by fresh water before they can coagulate, separating the same from the meat residue, and finally coagulating the muscle proteids.

In witness whereof we have hereunto set our hands in presence of two witnesses.

UMBERTO CIANTAR.
FREDERICK WILLIAM FORBES ROSS.

Witnesses:
A. NUTTING,
J. O'DONNELL.